(12) United States Patent
Shi et al.

(10) Patent No.: US 9,488,371 B2
(45) Date of Patent: Nov. 8, 2016

(54) SYSTEM FOR GASIFICATION FUEL INJECTION

(75) Inventors: Shaoping Shi, Houston, TX (US); Constantin Dinu, Houston, TX (US); Shashishekara Sitharamarao Talya, Houston, TX (US)

(73) Assignee: General Electric Company, Schenectady, NY (US)

( * ) Notice: Subject to any disclaimer, the term of this patent is extended or adjusted under 35 U.S.C. 154(b) by 632 days.

(21) Appl. No.: 13/207,352

(22) Filed: Aug. 10, 2011

(65) Prior Publication Data

US 2013/0040255 A1 Feb. 14, 2013

(51) Int. Cl.
| | |
|---|---|
| *F23D 14/62* | (2006.01) |
| *F23N 5/00* | (2006.01) |
| *B05B 7/08* | (2006.01) |
| *F02C 1/00* | (2006.01) |
| *F23D 17/00* | (2006.01) |
| *F23N 1/00* | (2006.01) |
| *F23R 3/28* | (2006.01) |
| *F23R 3/36* | (2006.01) |

(Continued)

(52) U.S. Cl.
CPC .............. *F23D 17/00* (2013.01); *C10J 3/503* (2013.01); *C10J 3/506* (2013.01); *C10J 3/723* (2013.01); *C10J 3/74* (2013.01); *C10J 3/76* (2013.01); *F23N 1/002* (2013.01); *F23R 3/28* (2013.01); *F23R 3/36* (2013.01); *C10J 2200/152* (2013.01); *C10J 2300/092* (2013.01); *C10J 2300/093* (2013.01); *C10J 2300/0943* (2013.01); *C10J 2300/0946* (2013.01); *C10J 2300/0956* (2013.01); *C10J 2300/0959* (2013.01); *C10J 2300/0969* (2013.01); *C10J 2300/0973* (2013.01); *C10J 2300/0976* (2013.01); *F23D 2214/00* (2013.01); *F23N 2037/08* (2013.01); *F23R 2900/00004* (2013.01); *Y02E 20/16* (2013.01); *Y02E 20/18* (2013.01)

(58) Field of Classification Search
CPC .............. C10J 3/723; C10J 3/74; C10J 3/76; C10J 3/503; C10J 3/506; F23N 1/002; F23R 3/28; F23R 3/36; F23D 17/00
USPC ........... 431/75, 354; 239/422, 424.5; 60/740
See application file for complete search history.

(56) References Cited

U.S. PATENT DOCUMENTS 3,684,186 A * 8/1972 Helmrich ...................... 239/400
4,351,647 A * 9/1982 Marion ................... C01B 3/363
                                                          252/373

(Continued)

FOREIGN PATENT DOCUMENTS

| CN | 2306406 Y | 2/1999 |
| WO | 2009093098 A2 | 7/2009 |

*Primary Examiner* — William G Corboy
(74) *Attorney, Agent, or Firm* — Fletcher Yoder, P.C.

(57) ABSTRACT

A system includes a gasification fuel injector, which includes a first fuel conduit configured to inject a first fuel flow from a first fuel tip, a second fuel conduit configured to inject a second fuel flow from a second fuel tip, a first gas conduit configured to inject a first gas flow from a first gas tip, a second gas conduit configured to inject a second gas flow from a second gas tip, and a third gas conduit configured to inject a third gas flow from a third gas tip. At least one of the first fuel tip, the second fuel tip, the first gas tip, the second gas tip, or the third gas tip is recessed a distance away from an outlet of the gasification fuel injector. The first and second fuel conduits and the first, second, and third gas conduits are coaxial with one another.

6 Claims, 4 Drawing Sheets

(51) Int. Cl.
  *C10J 3/50* (2006.01)
  *C10J 3/72* (2006.01)
  *C10J 3/74* (2006.01)
  *C10J 3/76* (2006.01)

(56) References Cited

U.S. PATENT DOCUMENTS

| | | | |
|---|---|---|---|
| 4,443,228 A * | 4/1984 | Schlinger | 48/86 R |
| 4,491,456 A * | 1/1985 | Schlinger | C01B 3/363 252/373 |
| 5,505,045 A * | 4/1996 | Lee | F23D 11/107 239/424 |
| 5,785,721 A | 7/1998 | Brooker | |
| 6,276,611 B1 | 8/2001 | Brooker et al. | |
| 6,773,630 B2 | 8/2004 | Stellaccio et al. | |
| 6,805,773 B1 | 10/2004 | Brooker | |
| 7,506,822 B2 | 3/2009 | Cairo et al. | |
| 7,587,914 B2 * | 9/2009 | Roba | C03B 19/1423 65/413 |
| 8,353,698 B2 * | 1/2013 | Moberg | 431/187 |
| 2007/0095046 A1 * | 5/2007 | Wallace | B01J 4/001 60/39.12 |
| 2009/0272034 A1 * | 11/2009 | Guo | 48/62 R |
| 2012/0160140 A1 * | 6/2012 | Venkatesan | B05B 7/0408 110/101 R |

* cited by examiner

SYSTEM FOR GASIFICATION FUEL INJECTION

BACKGROUND OF THE INVENTION

The subject matter disclosed herein relates to fuel injectors, and, more particularly, to fuel injectors for gasifiers.

A variety of combustion systems employs fuel injectors to inject a fuel into a combustion chamber. For example, an integrated gasification combined cycle (IGCC) power plant includes a gasifier with one or more fuel injectors. The fuel injectors supply a fuel, such as an organic feedstock, into the gasifier along with oxygen and steam to generate a syngas. However, existing fuel injectors may not perform well in large gasifiers at high flow rates. For example, at high flow rates, existing fuel injectors may not be able to completely atomize the fuel or provide adequate mixing. Unfortunately, incomplete atomization or inadequate mixing of the fuel may decrease the efficiency of the fuel injector and the gasifier.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gasification fuel injector, which includes a first fuel conduit configured to inject a first fuel flow from a first fuel tip, a second fuel conduit configured to inject a second fuel flow from a second fuel tip, a first gas conduit configured to inject a first gas flow from a first gas tip, a second gas conduit configured to inject a second gas flow from a second gas tip, and a third gas conduit configured to inject a third gas flow from a third gas tip. At least one of the first fuel tip, or the second fuel tip, or the first gas tip, or the second gas tip, or the third gas tip is recessed a distance away from an outlet of the gasification fuel injector. The first and second fuel conduits and the first, second, and third gas conduits are coaxial with one another.

In a second embodiment, a system includes a fuel injector, which includes a first fuel conduit configured to inject a first fuel flow from a first fuel tip, a second fuel conduit configured to inject a second fuel flow from a second fuel tip, a first oxygen conduit configured to inject a first oxygen flow from a first oxygen tip, a second oxygen conduit configured to inject a second oxygen flow from a second oxygen tip, and a cooling gas conduit configured to inject a cooling gas flow from a cooling gas tip. The first and second fuel conduits, the first and second oxygen conduits, and the cooling gas conduit are coaxial with one another. The cooling gas conduit surrounds the first and second fuel conduits and the first and second oxygen conduits.

In a third embodiment, a system includes a combustion chamber and a fuel injector coupled to the combustion chamber. The fuel injector includes a first fuel conduit configured to inject a first fuel flow from a first fuel tip, a second fuel conduit configured to inject a second fuel flow from a second fuel tip, a first gas conduit configured to inject a first gas flow from a first gas tip, a second gas conduit configured to inject a second gas flow from a second gas tip, and a third gas conduit configured to inject a third gas flow from a third gas tip. The first and second fuel conduits and the first, second, and third gas conduits are coaxial with one another. The first fuel conduit surrounds the first gas conduit with a first radial gap, the second gas conduit surrounds the first fuel conduit with a second radial gap, the second fuel conduit surrounds the second gas conduit with a third radial gap, and the third gas conduit surrounds the second fuel conduit with a fourth radial gap. At least two of the first, second, third and fourth radial gaps are different from one another.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
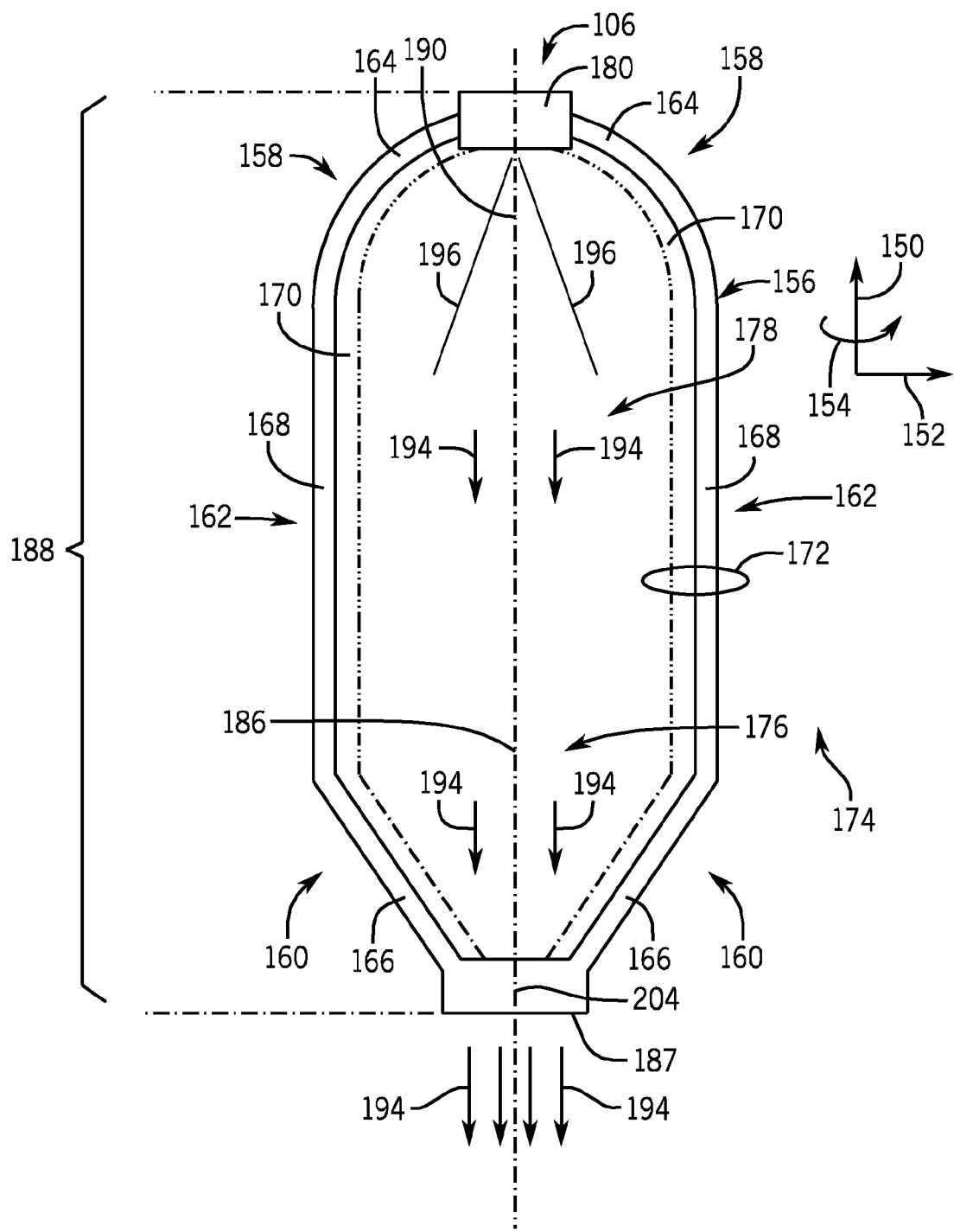
FIG. 1 is a cross-sectional side view of a gasifier that includes an embodiment of a fuel injector.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments incorporate a gasification fuel injector with more than one conduit, and particularly 5, 6, 7, 8, 9, 10, or more conduits. For example, the fuel injector may include five or more conduits arranged in an alternating arrangement of fuel and gas conduits. By further example, the gasification fuel injector may include a first fuel conduit that injects a first fuel flow from a first fuel tip and a second fuel conduit that injects a second fuel flow from a second fuel tip. The gasification fuel injector may also include a first gas conduit that injects a first gas flow from a first gas tip, a second gas conduit that injects a second gas flow from a second gas tip, and a third gas conduit that injects a third gas flow from a third gas tip. At least one of the first or second fuel tips or the first, second, or third gas tips may be recessed a distance away from an outlet of the gasification fuel injector. In other words, not all of the tips of the gasification fuel injector may be flush, or axially aligned, with one another. This axially staggered arrangement of tips may substantially improve mixing of the fuel with gas, e.g., oxygen, air, carbon dioxide, nitrogen, or a flame resistant gas. The gasification fuel injector may be disposed in a gasifier.

In addition, certain embodiments of the fuel injector may include five or more conduits (e.g., 5, 6, 7, 8, 9, 10, or more) in a coaxial or concentric arrangement, wherein the coaxial conduits alternate from fuel conduits to gas conduits to improve mixing between the fuel and gas. In the embodiment with five conduits noted above, the first and second fuel conduits and the first, second, and third gas conduits may be coaxial with one another. Thus, passages between the conduits of the gasification fuel injector may have an annular shape. By dividing fuel supplied to the gasification fuel injector into the first fuel flow and the second fuel flow, the gasification fuel injector may better atomize the fuel because small fuel flows are generally easier to atomize than large fuel flows. Atomization may refer to the generation of a fine spray of a liquid. In addition, in certain embodiments, two gas conduits may surround both the first and second fuel conduits. In other words, both the first and second fuel conduits may be located between two gas conduits. Shearing forces provided by the two gas conduits acting on the fuel flows may further improve the atomization of the fuel. Further, recessing at least one of the tips of the gasification fuel injector may provide better premixing and thus, better atomization of the fuel, prior to exiting the gasification fuel injector. In further embodiments, each of the passages between the conduits of the gasification fuel injector may be defined by a radial gap. At least two of the radial gaps may be different from one another. For example, radial gaps of the gas conduits and/or fuel conduits may be selected to improve the atomization of the fuel.

In other embodiments, the third gas conduit may surround the other conduits of the gasification fuel injector and may inject a cooling gas flow, such as carbon dioxide, nitrogen, or a flame resistant gas. The cooling gas flow may help reduce a temperature of the third gas conduit. As the outermost conduit of the gasification fuel injector may be exposed to hot gases generated in the gasifier, flowing the cooling gas flow through the third gas conduit may help maintain a temperature of the gasification fuel injector below a threshold temperature, thereby improving the overall life, or service time, of the gasification fuel injector.

Turning now to the drawings, FIG. 1 is a cross-sectional side view of a gasifier 106 that includes an embodiment of a fuel injector 180. In further embodiments, the fuel injector 180 may be disposed in similar devices, such as, but not limited to, a gas turbine engine, a combustion engine, a combustion system, a boiler, a reactor, a combustor, or any combination thereof. As discussed in detail below, various embodiments of the fuel injector 180 may include five or more conduits (e.g., 5, 6, 7, 8, 9, 10, or more) to help improve atomization of a fuel flowing out of the fuel injector 180. The gasifier 106 may have an axial axis or direction 150, a radial axis or direction 152, and a circumferential axis or direction 154. The gasifier 106 includes an enclosure 156, also referred to as the shell, that functions as a housing or outer casing for the gasifier 106. The enclosure 156 includes a first end portion 158 and a second end portion 160. An intermediate portion 162 is defined by the section of the enclosure 156 that lies axially between the first end portion 158 and the second end portion 160. The first end portion 158 and the second end portion 160 include a dome-shaped top wall 164, and a triangular-shaped (e.g., conical shaped) bottom wall 166, respectively. A side wall 168 (e.g., annular side wall) parallel to the axis 150 is disposed in the intermediate portion 162 between the top wall 164 and the bottom wall 166.

The illustrated embodiment also includes a thermal barrier 170 concentrically disposed inside the enclosure 156. The thermal barrier 170 and the enclosure 156 form a wall assembly 172 that separates an exterior 174 of the gasifier 106 from an interior 176 of the gasifier 106. The interior 176 includes a gasification chamber 178, or combustion chamber, where pyrolysis, combustion, gasification, or a combination thereof, may occur. The wall assembly 172 is configured to block heat transfer and leakage of gaseous components from the interior 176 to the exterior 174 during gasification. Additionally, the thermal barrier 170 may be configured to maintain the surface temperature of the enclosure 156 within a desired temperature range. Accordingly, the thermal barrier 170 may include passive shielding, active cooling, or a combination thereof. For example, the thermal barrier 170, or refractory insulating lining, may be made of any material that maintains its predetermined physical and chemical characteristics upon exposure to high temperatures.

In the embodiment illustrated in FIG. 1, the fuel injector 180 is disposed in the top wall 164 of the first end portion 158 of the enclosure 156. The fuel injector 180 is longitudinally offset from an outlet 187 by a distance 188 and includes an injection axis 190 that determines the general orientation of the flow originating from the fuel injector 180. The fuel injector 180 may be configured to inject fuel, oxygen (e.g., air), cooling gas (e.g., carbon dioxide, nitrogen, or a flame resistant gas), or a mixture of fuel, oxygen, and cooling gas into the gasification chamber 178. For instance, the fuel injector 180 may inject fuel in the form of a carbonaceous feedstock, such as coal, petroleum, or biomass. In fact, the fuel injector 180 may inject any material suitable for the production of synthetic gas, or syngas, via gasification (e.g., organic materials, such as wood or plastic waste). In certain embodiments, the fuel may be a liquid slurry, such as a coal slurry. In other embodiments, the fuel injector 180 may inject a controlled amount of oxygen and/or steam either alone or in combination with a suitable fuel.

In the illustrated embodiment, the injection axis 190 is parallel to the axis 150 and perpendicular to the radial axis 152 of the gasifier 106. In other words, the injection axis 190 is parallel to a longitudinal axis 186. Such a feature has the effect of directing a fluid flow emerging from the fuel injector 180 in a generally downward direction (e.g., downstream flow direction), as indicated by arrows 194, through the gasification chamber 178 during use. In certain embodiments, the injection axis 190 may be directed away from the longitudinal axis 186 by an angle between approximately 0 to 45, 0 to 30, 0 to 20, or 0 to 10 degrees. Furthermore, certain embodiments of the fuel injector 180 may provide a divergent spray, e.g., fluid flow originating from the fuel injector 180 may diverge outward toward the side walls 168 in a generally downward direction (e.g., downstream flow direction), as indicated by reference numeral 196.

In the illustrated embodiment of the gasifier 106, the resultant syngas emerges from the gasifier 106 via outlet 187 along a path generally defined by outlet axis 204. That is, the syngas exits the gasifier 106 via a location in the bottom wall 166 of the gasifier 106. However, it should be noted that the gasifier design disclosed herein may be used with a variety of other gasification systems wherein the outlet is not disposed in a bottom wall. For instance, the disclosed embodiments may be used in conjunction with entrained flow gasifiers. In such embodiments, the direction of flow through the gasification chamber 178 may be upward through the gasifier 106, i.e., in a direction opposite arrows 194. In these systems, the resultant syngas may exit an outlet located on or near the top wall 164 of the gasifier 106, while the molten slag may exit through the bottom wall 166. For further example, the disclosed embodiments may be employed in fluidized bed gasifiers. Likewise, the outlet in such devices may be located near the top wall 164 of the gasifier 106 since the direction of flow is generally upward.

Figure 2:
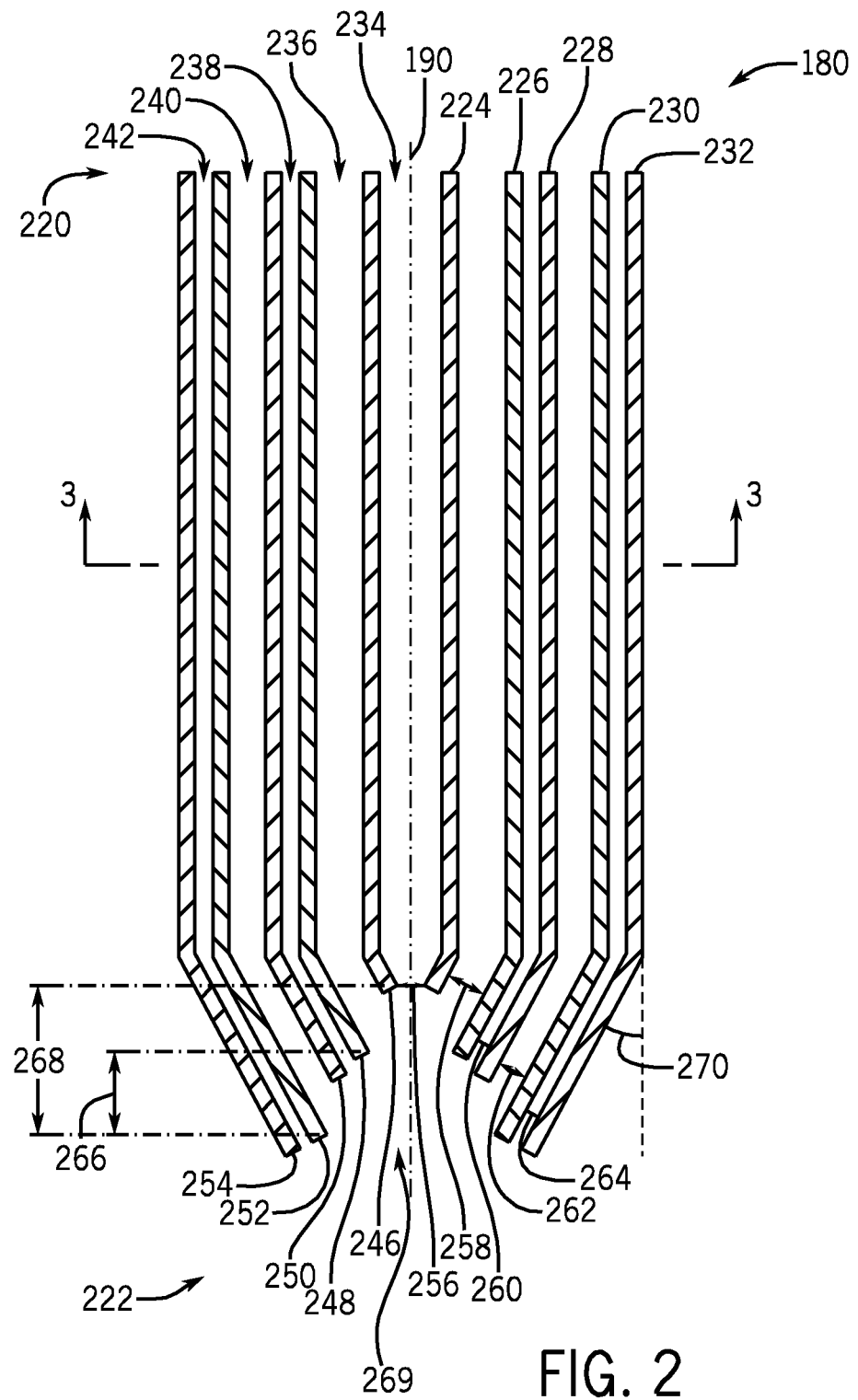
FIG. 2 is an axial cross-section of an embodiment of a fuel injector with five passages.

FIG. 2 is an axial cross-section of the fuel injector 180 in accordance with an embodiment. As shown in FIG. 2, the injection axis 190 passes through the center of the fuel injector 180. The fuel injector 180 has an upstream side 220, from which the feedstock, oxygen, cooling gas, and other materials may originate. The fuel injector 180 also has a tip 222, where the feedstock, oxygen, cooling gas, and other materials may exit. Thus, the tip 222 is an outlet for the materials. Turning next to the conduits of the fuel injector 180, although one arrangement of conduits will be described, other arrangements are possible depending on the requirements of the particular application. Specifically, the fuel injector 180 includes a first conduit 224, a second conduit 226, a third conduit 228, a fourth conduit 230, and a fifth conduit 232. The conduits 224, 226, 228, 230, and 232 are structural elements of the fuel injector 180 that help guide or direct materials through the fuel injector 180. As shown in FIG. 2, the second conduit 226 surrounds the first conduit 224, the third conduit 228 surrounds the second conduit 226, the fourth conduit 230 surrounds the third conduit 228, and the fifth conduit 232 surrounds the fourth conduit 230, all in a coaxial or concentric arrangement. Thus, the illustrated embodiment has five coaxial or concentric conduits 224, 226, 228, 230, and 232, which may be annular, oval, rectangular, or any other shape. The first conduit 224 supplies a first flow 234, the second conduit 226 supplies a second flow 236, the third conduit 228 supplies a third flow 238, the fourth conduit 230 supplies a fourth flow 240 and the fifth conduit 232 supplies a fifth flow 242, all in a coaxial or concentric arrangement.

In certain embodiments, the five coaxial conduits 224, 226, 228, 230, and 232 may be configured to provide the flows 234, 236, 238, 240, and 242 in an alternating arrangement of fuel and gas flows to enhance mixing and atomization of the fuel. For example, the first flow 234 may be a first gas flow, the second flow 236 may be a first fuel flow, the third flow 238 may be a second gas flow, the fourth flow 240 may be a second fuel flow, and the fifth flow 242 may be a third gas flow. The first and second fuel flows may be the same or different. For example, both the first and second fuel flows may be liquid fuels, both may be gaseous fuels, both may be carbonaceous feedstocks, or one may be a liquid fuel and one may be a gaseous fuel. Similarly, the first, second, and third gas flows may be the same or different. For example, all three of the first, second, and third gas flows may be oxygen, two of the gas flows may be oxygen and one may be a cooling gas, or one may be oxygen, one may be nitrogen, and one may be carbon dioxide. In one embodiment, the first and second fuel flows may be a liquid fuel, such as a coal slurry, the first and second gas flows may be oxygen, and the third gas flow may be carbon dioxide or nitrogen. As shown in FIG. 2, the flows 234, 236, 238, 240, and 242 flow through the passages, or spaces, between the conduits 224, 226, 228, 230, and 232. The first, second, and third gas flows may include oxygen, cooling gas, steam, or any combination thereof. In such embodiments, the first fuel flow 236 is surrounded by the first gas flow 234 and the second gas flow 238. Similarly, the second fuel flow 240 is surrounded by the second gas flow 238 and the third gas flow 242. In other words, both the first and second fuel flows 236 and 240 are surrounded by, or in between, two gas flows. Thus, the two gas flows act on the fuel flow on opposite sides (e.g., radially inside and radially outside), which may help to shear, or break up, the fuel flow, thereby improving the atomization of the fuel. In addition, one or more of the conduits 224, 226, 228, 230, and 232 may flow a mixture of materials.

As shown in FIG. 2, the first flow 234 is injected from a first tip 246, the second flow 236 is injected from a second tip 248, the third flow 238 is injected from a third tip 250, the fourth flow 240 is injected from a fourth tip 252, and the fifth flow 242 is injected from a fifth tip 254. Further, each of the conduits of the fuel injector 180 is defined by a radial gap, or distance between adjacent conduits. Specifically, the first conduit 224 has a first radial tip gap 256 (e.g., diameter), the second conduit 226 has a second radial tip gap 258 between the first and second conduits 224 and 226, the third conduit 228 has a third radial tip gap 260 between the second and third conduits 226 and 228, the fourth conduit 230 has a fourth radial tip gap 262 between the third and fourth conduits 228 and 230, and the fifth conduit 232 has a fifth radial tip gap 264 between the fourth and fifth conduits 230 and 232. As shown in FIG. 2, not all of the radial tip gaps 256, 258, 260, 262, and 264 may be the same. For example, at least two of the radial tip gaps 256, 258, 260, 262, and 264 may be different from one another. More specifically, the second and fourth radial tip gaps 258 and 262 may be greater than the third and fifth radial tip gaps 260 and 264. In certain embodiments, a ratio of the second or fourth radial tip gaps 258 and 262 to the third or fifth tip radial gaps 260 and 264 may be between approximately 1.1:1 to 35:1, 1.2:1 to 20:1, 2:1 to 15:1, 2.3:1 to 15:1, 2.4:1 to 10:1, 2.5:1 to 5:1, or 3:1 to 5:1. For example, the first radial tip gap 256 may be between approximately 2.5 cm to 5.1 cm, 3.0 cm to 4.6 cm, or 3.6 cm to 4.1 cm. The second radial tip gap 258 may be between approximately 1.3 cm to 2.5 cm, 1.5 cm to 2.3 cm, or 1.8 cm to 2.0 cm. The third radial tip gap 260 may be between approximately 0.3 cm to 2.5 cm, 0.5 cm to 2.0 cm, or 1.0 cm to 1.5 cm. The fourth radial tip gap 262 may be between approximately 0.3 cm to 2.5 cm, 0.5 cm to 2.0 cm, or 1.0 cm to 1.5 cm. The fifth radial tip gap 264 may be between approximately 0.1 cm to 1.3 cm, 0.3 cm to 1.0 cm, or 0.5 cm to 0.8 cm. The smaller third and fifth radial tip gaps 260 and 264 may cause the third and fifth flows 238 and 242 to flow through the third and fifth conduits 228 and 232 at a higher velocity than the second and fourth flows 236 and 240 through the second and fourth conduits 226 and 230. In other words, gases may flow through smaller passages at higher gas flow velocities than through larger passages. Additionally, flow control elements, such as control valves, may be used to control the gas velocities at the sources of the gases. Thus, the higher gas flow velocities of the second and third gas flows 238 and 242 may improve the atomization of the second fuel flow 240. In other words, increasing the gas flow velocities of the second and third gas flows 238 and 242 may increase the shearing, or turbulence, of the second fuel flow 240, thereby improving the atomization of the fuel flow. Similarly, the higher gas flow velocities of the first and second gas flows 234 and 238 may improve the atomization of the first fuel flow 236. In certain embodiments, the gas flow velocities of the first, second, or third gas flows 234, 238, and 242 may be between approximately 45 m/s to 230 m/s, 75 m/s to 200 m/s, or 110 m/s to 170 m/s. In contrast, the flow velocities of the first or second fuel flows 236 and 240 may be between approximately 5 m/s to 25 m/s, 10 m/s to 20 m/s, or 15 m/s to 17 m/s. Thus, a ratio of the gas flow velocity to the fuel flow velocity may be between approximately 5:1 to 50:1, 7:1 to 30:1, 10:1 to 25:1, 13:1 to 15:1, or 15:1 to 20:1.

As shown in FIG. 2, not all of the tips 246, 248, 250, 252, and 254 of the fuel injector 180 are flush, or axially aligned, with one another. For example, the second and third tips 248 and 250 may be recessed a distance 266 from the fourth and fifth tips 252 and 254. In certain embodiments, the distance 266 may be between approximately 3 cm to 10 cm, 4 cm to 9 cm, or 5 cm to 8 cm. Similarly, the first tip 246 may be recessed a distance 268 from the fourth and fifth tips 252 and 254. In certain embodiments, the distance 268 may be between approximately 2 cm to 20 cm, 4 cm to 18 cm, or 6 cm to 16 cm. In other embodiments, the arrangement of the tips 246, 248, 250, 252, and 254 may be different from that shown in FIG. 2. For example, one, two, three, or four of the tips 246, 248, 250, 252, and 254 may be recessed from the tip 222 of the fuel injector 180. By recessing at least one of the tips 246, 248, 250, 252, and 254, the materials flowing through the fuel injector 180 may be able to mix in a premix zone 269 prior to leaving the tip 222. In other words, recessing at least one of the tips 246, 248, 250, 252, and 254 may provide for premixing of the materials flowing through the fuel injector 180 prior to reaching the tip 222. Such premixing of the materials flowing through the fuel injector 180 may further improve the atomization of the first and second fuel flows 236 and 240. In addition, the axially recessed arrangement of the tips 246, 248, 250, 252, and 254 may help to protect inner tips (e.g., tips 246, 248, 250, and 252) from the hot gases within the gasifier 106.

As shown in FIG. 2, the one or more of tips 246, 248, 250, 252, and 254 of the fuel injector 180 may be inclined at an angle 270 relative to (e.g., toward) the injection axis 190. In other words, the conduits 224, 226, 228, 230, and 232 may converge toward one another at the tip 222 of the fuel injector 180. Such an arrangement of the conduits 224, 226, 228, 230, and 232 may help to intensify the premixing of materials in the premix zone 269 of the fuel injector 180. In other words, the materials flowing through the premix zone 269 of the fuel injector 180 are directed toward one another, thereby increasing turbulence and atomization of the first and second fuel flows 236 and 240. In certain embodiments, the angle 270 may be between approximately 10 degrees to 50 degrees, 15 degrees to 45 degrees, or 20 degrees to 40 degrees.

Figure 3:
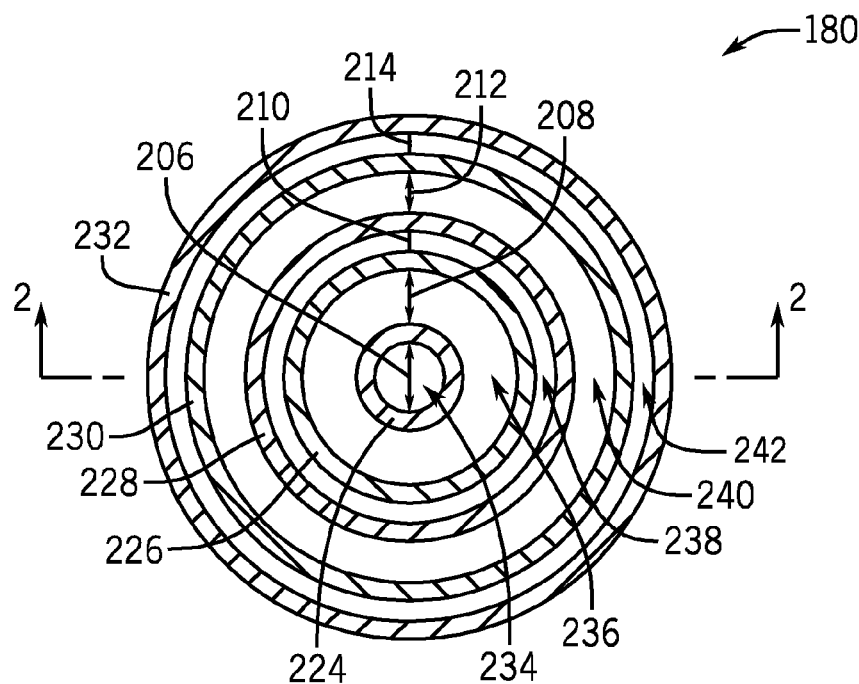
FIG. 3 is a radial cross-section of an embodiment of a fuel injector with five passages taken along line 3-3 of FIG. 2.

To illustrate the structure of the conduits described above from a different perspective, FIG. 3 is a radial cross-section of an embodiment of the fuel injector 180 along the line labeled 3-3 in FIG. 2. Correspondingly, the axial cross-section of FIG. 2 is indicated along the line labeled 2-2 in FIG. 3. Elements in common with those shown in FIG. 2 are labeled with the same reference numerals. In the particular embodiment shown, each of the conduits 224, 226, 228, 230, and 232 appears as an annular ring in the radial cross-section. Thus, the annular conduits 224, 226, 228, 230, and 232 are coaxial or concentric with one another, thereby providing co-flows of the flows 234, 236, 238, 240, and 242. Further, each of the conduits of the fuel injector 180 is defined by the distance between adjacent conduits, or radial gap. Specifically, the first conduit 224 has a first radial gap 206 (e.g., diameter), the second conduit 226 has a second radial gap 208 between the first and second conduits 224 and 226, the third conduit 228 has a third radial gap 210 between the second and third conduits 226 and 228, the fourth conduit 230 has a fourth radial gap 212 between the third and fourth conduits 228 and 230, and the fifth conduit 232 has a fifth radial gap 214 between the fourth and fifth conduits 230 and 232. As shown in FIG. 3, not all of the radial gaps 206, 208, 210, 212, and 214 may be the same. For example, at least two of the radial gaps 206, 208, 210, 212, and 214 may be different from one another. Further, the radial gaps 206, 208, 210, 212, and 214 may be different from the corresponding radial tip gaps, i.e. 256, 258, 260, 262, and 264, respectively. For example, the first radial gap 206 may be greater than the first radial tip gap 256. In addition, the radial gaps 206, 208, 210, 212, and 214 and/or the radial tip gaps 256, 258, 260, 262, and 264 may be configured to adjust the flow rate of the materials passing through the conduits. For example, decreasing a radial gap or radial tip gap may increase the gas flow velocity of the material flowing through the conduit. Similarly, increasing a radial gap or radial tip gap may decrease the gas flow velocity of the material flowing through the conduit.

Other arrangements of flows through the fuel injector 180 other than that illustrated in FIG. 3 are possible as well. For example, the fifth conduit 232 may flow a cooling gas 242. For example, the cooling gas 242 may include, but is not limited to, carbon dioxide, nitrogen, a flame resistant gas, and so forth. The cooling gas 242 may not participate in the combustion within the gasifier 106, but may help to cool the fuel injector 180. For example, the fifth conduit 232 may be more likely to be exposed to the hot gases generated within the gasifier 106. Continued exposure to the hot gases may cause cracking and eventual failure of the fuel injector 180 because of the high temperatures. Thus, the cooling gas 242 flowing through the fifth conduit 232 may help to remove the heat from the hot gases, thereby protecting the fifth conduit 232 from the effects of high temperature and extending the life of the fuel injector 180. Further, by surrounding the other conduits 224, 226, 228, and 230, the cooling gas 242 may help to protect these conduits from the high temperature effects of the hot gases generated within the gasifier 106. Moreover, combustion may occur further away from the fifth tip 254 because the cooling gas 242 is non-combustible. In other words, the cooling gas 242 may help push any flames or combustion further away from the fifth tip 254, thereby reducing flame attachment to the fuel injector 180. In other embodiments, the cooling gas may flow through another conduit or through more than one conduit of the fuel injector 180.

Figure 4:
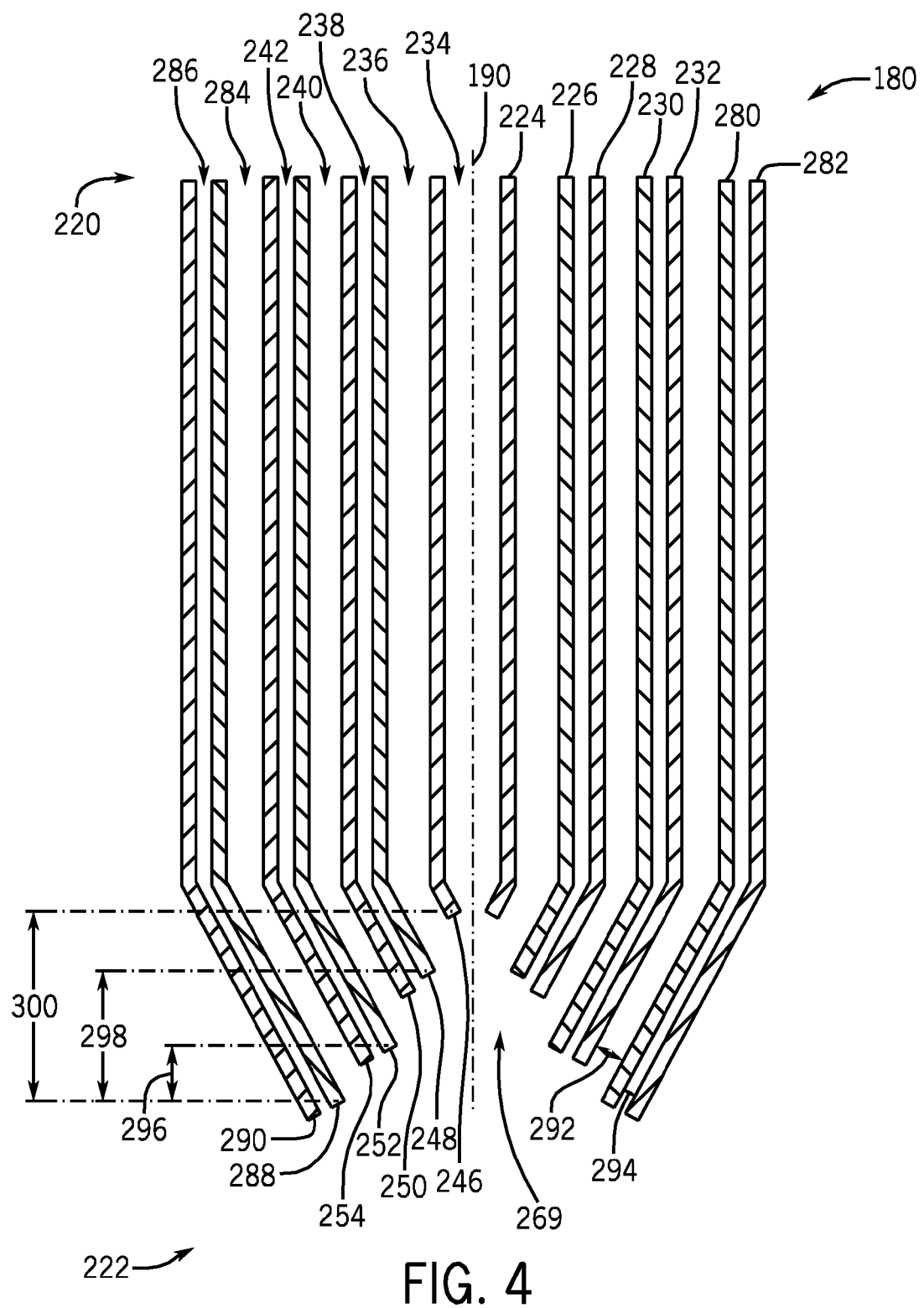
FIG. 4 is a an axial cross-section of an embodiment of a fuel injector with seven passages.

FIG. 4 is an axial cross-section of the fuel injector 180 in accordance with an embodiment. Elements in common with those shown in FIG. 2 are labeled with the same reference numerals. As shown in FIG. 4, the fuel injector 180 includes a sixth conduit 280 and seventh conduit 282. Thus, the fuel injector 180 supplies a sixth flow 284 and a seventh flow 286. In certain embodiments, the sixth flow 284 may be a third fuel flow and the seventh flow 286 may be a fourth gas flow. Thus, the third fuel flow 284 may be surrounded by two gas flows, namely the third gas flow 242 and the fourth gas flow 286. As shown in FIG. 4, the sixth conduit 280 includes a sixth tip 288 and the seventh conduit 282 includes a seventh tip 290. Both the sixth and seventh tips 288 and 290 may converge toward the injection axis 190. The sixth conduit 280 may be defined by a sixth radial gap 292 between the fifth and sixth conduits 232 and 280, and the seventh conduit 282 may be defined by a seventh radial gap 294 between the sixth and seventh conduits 280 and 282. As shown in FIG. 4, the sixth radial gap 292 may be greater than the seventh radial gap 294. Thus, the gas flow velocity of the third gas flow 242 and the fourth gas flow 286 may be greater than the velocity of the third fuel flow 284. Again, the sandwiching of each fuel flow between adjacent higher velocity gas flows enhances mixing and atomization of the fuel. Further, the tips of the fuel injector 180 are axially staggered, or not flush, with respect to one another. Again, the axially staggered arrangement of tips enhances mixing of the fuel and gas flows. For example, the fourth and fifth tips 252 and 254 are recessed a distance 296 from the sixth and seventh tips 288 and 290. In certain embodiments, the distance 296 may be between approximately 1 cm to 10 cm, 2 cm to 9 cm, or 3 cm to 8 cm. The second and third tips 248 and 250 are recessed a distance 298 from the sixth and seventh tips 288 and 290. In certain embodiments, the distance 298 may be between approximately 2 cm to 20 cm, 4 cm to 18 cm, or 6 cm to 16 cm. Similarly, the first tip 246 is recessed a distance 300 from the sixth and seventh tips 288 and 290. In certain embodiments, the distance 300 may be between approximately 6 cm to 30 cm, 9 cm to 27 cm, or 12 cm to 24 cm. By dividing the fuel to the fuel injector 180 into the first fuel flow 236, the second fuel flow 240, and the third fuel flow 284, the fuel injector 180 may provide improved atomization of the fuel compared to a fuel injector with fewer fuel flows. In other words, the atomization of the fuel may improve as the flow rate of the fuel decreases. For example, lower flow rates of fuel may be thinner and easier to atomize than thicker flow rates of fuel because of the lower momentum of thinner flow rates. In other respects, the fuel injector 180 shown in FIG. 4 with seven conduits may be similar to the fuel injector 180 shown in FIG. 2 with five conduits. In other embodiments, the arrangement of the conduits and flows of the fuel injector 180 may be different from that shown in FIGS. 2-4.

Figure 5:
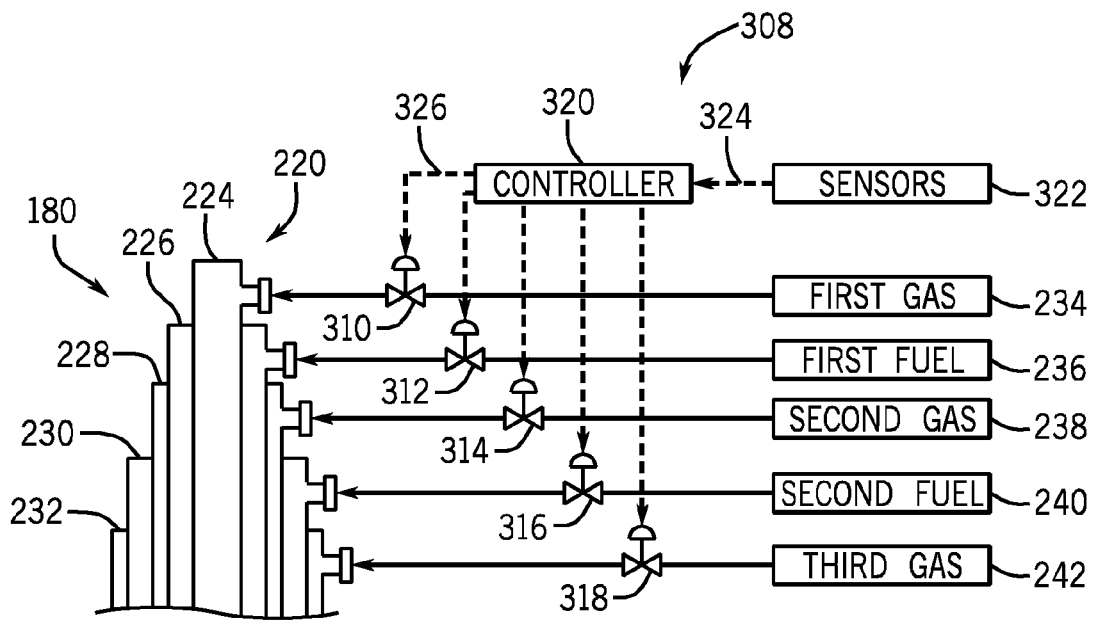
FIG. 5 is a block diagram of an embodiment of a controller used to control a fuel injector with five passages.

FIG. 5 is a block diagram of an embodiment of a system 308 that may be used to control the fuel injector 180. As shown in FIG. 5, the fuel injector 180 includes the five conduits 224, 226, 228, 230, and 232 as illustrated in FIGS. 2 and 3. A first gas control valve 310, or any other type of flow control element, may be used to adjust a flow rate of the first gas flow 234. Similarly, a first fuel control valve 312 may be used to adjust a flow rate of the first fuel flow 236, a second gas control valve 314 may be used to adjust a flow rate of the second gas flow 238, a second fuel control valve 316 may be used to adjust a flow rate of the second fuel flow 240, and a third gas control valve 318 may be used to control a flow rate of the third gas flow 242. A controller 320 may be used to control the control valves 310, 312, 314, 316, and 318. Specifically, one or more sensors 322 may transmit signals 324 to the controller 320. The signals 324 from the sensors 322 may be indicative of one or more operating parameters or conditions of the gasifier 106, the gasification chamber 178 of the gasifier 106, or a gasification system that includes the gasifier 106. Based on the input from the sensors 322, the controller 320 may transmit one or more signals 326 to the control valves 310, 312, 314, 316, and 318. For example, the sensors 322 may indicate a temperature of the gasifier 106 above a threshold. Thus, the controller 320 may send signals 326 to one or more of the control valves 310, 312, 314, 316, and 318 to reduce one or more of the flow rates of the first gas flow 234, first fuel flow 236, second gas flow 238, second fuel flow 240, or third gas flow 242. Alternatively, the sensors 322 may indicate a temperature of the gasifier 106 below a threshold. Thus, the controller 320 may transmit signals 326 to cause one or more of the control valves 310, 312, 314, 316, or 318 to open more. In other embodiments, the controller 320 may be used to control an amount of cooling provided by the third gas 242 or ratios of different fuels flowing through the fuel injector 180. For example, the controller 320 may adjust a ratio of a low heating value fuel to a high heating value fuel flowing through the fuel injector 180. In other embodiments, the controller 320 may be used to control a fuel-gas ratio, e.g., a ratio of fuel to air or a ratio of fuel to oxygen. In further embodiments, the controller 320 may be used to vary velocity ratios between fuel and gas flows, thereby adjusting an amount of shear between the fuel and gas flows and thus, the amount of atomization of the fuel. Thus, the controller 320 may be used together with the configuration of the fuel injector 180 to help improve the atomization of fuel flowing out of the fuel injector 180.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a gasifier configured to gasify one or more fuels to generate a syngas;
   a fuel injector fluidly coupled to the gasifier and comprising:
      a first fuel conduit fluidly coupled to a first fuel source via a first fuel flow path extending between the first fuel source and the first fuel conduit, wherein the first fuel conduit is configured to inject a first fuel flow from a first fuel tip;
      a second fuel conduit fluidly coupled to a second fuel source via a second fuel flow path extending between the second fuel source and the second fuel conduit, wherein the second fuel conduit is configured to inject a second fuel flow from a second fuel tip;
      a third fuel conduit fluidly coupled to a third fuel source via a third fuel flow path extending between the third fuel source and the third fuel conduit, wherein the third fuel conduit is configured to inject a third fuel flow from a third fuel tip;
      a first oxygen conduit fluidly coupled to a first oxygen source via a first oxygen flow path extending between the first oxygen source and the first oxygen conduit, wherein the first oxygen conduit is configured to inject a first oxygen flow from a first oxygen tip, wherein the first oxygen conduit is an inner most conduit of the fuel injector;
      a second oxygen conduit fluidly coupled to a second oxygen source via a second oxygen flow path extending between the second oxygen source and the second oxygen conduit, wherein the second oxygen conduit is configured to inject a second oxygen flow from a second oxygen tip;
      a third oxygen conduit fluidly coupled to a third oxygen source via a third oxygen flow path extending between the third oxygen source and the third oxygen conduit, wherein the third oxygen conduit is configured to inject a third oxygen flow from a third oxygen tip; and
      a gas conduit fluidly coupled to a gas source via a gas flow path extending between the gas source and the gas conduit, wherein the gas conduit is configured to inject a gas flow from a gas tip, wherein the first, second, and third fuel conduits, the first, second, and third oxygen conduits, and the gas conduit are coaxial with one another, wherein the gas conduit surrounds the first, second, and third fuel conduits and the first, second, and third oxygen conduits, wherein the first fuel tip, the second fuel tip, the first oxygen tip, the second oxygen tip, and the gas tip are axially recessed relative to an outlet of the fuel injector such that the first fuel tip, the first oxygen tip, the second fuel tip, and the second oxygen tip are varyingly recessed at varying distances away from the outlet of the fuel injector, wherein the first fuel conduit surrounds the first oxygen conduit with a first radial gap disposed between the first fuel conduit and the first oxygen conduit, the second oxygen conduit surrounds the first fuel conduit with a second radial gap disposed between the second oxygen conduit and the first fuel conduit, the second fuel conduit surrounds the second oxygen conduit with a third radial gap disposed between the second fuel conduit and the second oxygen conduit, the third oxygen conduit surrounds the second fuel conduit with a fourth radial gap disposed between the third oxygen conduit and the second fuel conduit, the third fuel conduit surrounds the third oxygen conduit with a fifth radial gap disposed between the third fuel conduit and the third oxygen conduit, and the gas conduit surrounds the third fuel conduit with a sixth radial gap disposed between the gas conduit and the third fuel conduit, and wherein the first, third, and fifth radial gaps are greater than the second, fourth, and sixth radial gaps.

2. The system of claim 1, wherein the first and third radial gaps are 1.1 to 35 times greater than the second and fourth radial gaps.

3. The system of claim 1, wherein the first and third radial gaps are 3 to 5 times greater than the second and fourth radial gaps.

4. The system of claim 1, wherein the first oxygen tip, the first fuel tip, the second oxygen tip, the second fuel tip, the third fuel tip and the third oxygen tip are progressively recessed at increasing distances away from the outlet of the fuel injector.

5. The system of claim 1, wherein the first, second, and third fuel tips and the first, second, and third oxygen tips each converge toward a longitudinal axis of the gasification fuel injector.

6. The system of claim 1, comprising a controller configured to control flows to inject the first fuel flow at a first fuel velocity, the second fuel flow at a second fuel velocity, the first oxygen flow at a first oxygen velocity, the second oxygen flow at a second oxygen velocity, and the third oxygen flow at a third oxygen velocity, wherein the first, second, or third oxygen velocity is greater than the first and second fuel velocities.

* * * * *